United States Patent

Murai

[11] Patent Number: 5,287,515
[45] Date of Patent: Feb. 15, 1994

[54] CROSS-SOFTWARE DEVELOPMENT/MAINTENANCE SYSTEM

[75] Inventor: Toshio Murai, Ichikawa, Japan

[73] Assignee: Kabushiki Kaisha Toshiba, Kawasaki, Japan

[21] Appl. No.: 946,823

[22] Filed: Sep. 18, 1992

Related U.S. Application Data

[63] Continuation of Ser. No. 412,991, Sep. 26, 1989, abandoned.

[30] Foreign Application Priority Data

Oct. 24, 1988 [JP] Japan ................. 63-267498

[51] Int. Cl.⁵ .................... G06F 15/00; G06F 9/00
[52] U.S. Cl. .................... 395/700; 364/DIG. 1; 364/228.1; 364/280.2; 364/238.4; 364/240.5
[58] Field of Search ............ 395/700; 364/228.1

[56] References Cited

U.S. PATENT DOCUMENTS

4,312,066  1/1982  Bantz ..................... 371/16
4,899,306  2/1990  Greer ..................... 364/900
5,022,028  6/1991  Edmonds ................. 371/25.1
5,022,028  6/1991  Edmonds et al. .......... 371/25.1

*Primary Examiner*—Gareth D. Shaw
*Assistant Examiner*—A. Katbab
*Attorney, Agent, or Firm*—Oblon, Spivak, McClelland, Maier & Neustadt

[57] ABSTRACT

A host computer system (host) develops an execution load module for a target computer system (target) having no software development environment, using a high-level language. The host and the target are connected to each other via an exclusive communication line through which the host sends the created execution load module to the target. The target has a disk controller CPU as well as a main CPU, the disk controller CPU receiving the execution load module from the host independent of the main CPU, and storing it in a disk device. When the execution module requires correction, this is performed in the host, by use of the high-level language, after which the corrected module is sent to the target.

38 Claims, 4 Drawing Sheets

CROSS-SOFTWARE DEVELOPMENT/MAINTENANCE SYSTEM

This application is a continuation of application Ser. No. 07/412,991, filed on Sep. 26, 1989, now abandoned.

BACKGROUND OF THE INVENTION

1. Field of the Invention

The present invention relates to a cross-software development/maintenance system for developing a cross-software program for a target computer system having no software development environment (e.g., a middle-capacity electronic exchange, or the like), using a host computer and transferring it to the target computer system.

2. Description of the Related Art

As a result of the rapid progress made in the development of information processing systems, various exchange systems now tend to employ electronic technologies, leading to the development of electronic exchanges employing a computer as part of an exchange control section. Exchange systems of this type are requested to have maximum processing capability for exchange, and their architectures are specified to be dedicated to serve as exchanges. For this reason, electronic exchanges (i.e., from small-capacity exchanges through larger-capacity devices) have themselves had no software development environment, so that up until now, development of software programs for electronic exchanges (development of a source program, development of an object program, debugging, development of an execution load module, and the like) has been performed by a host computer system, the compiled object software program then being transferred to a target computer system (in this case, an electronic exchange) to be executed.

Figure 1:
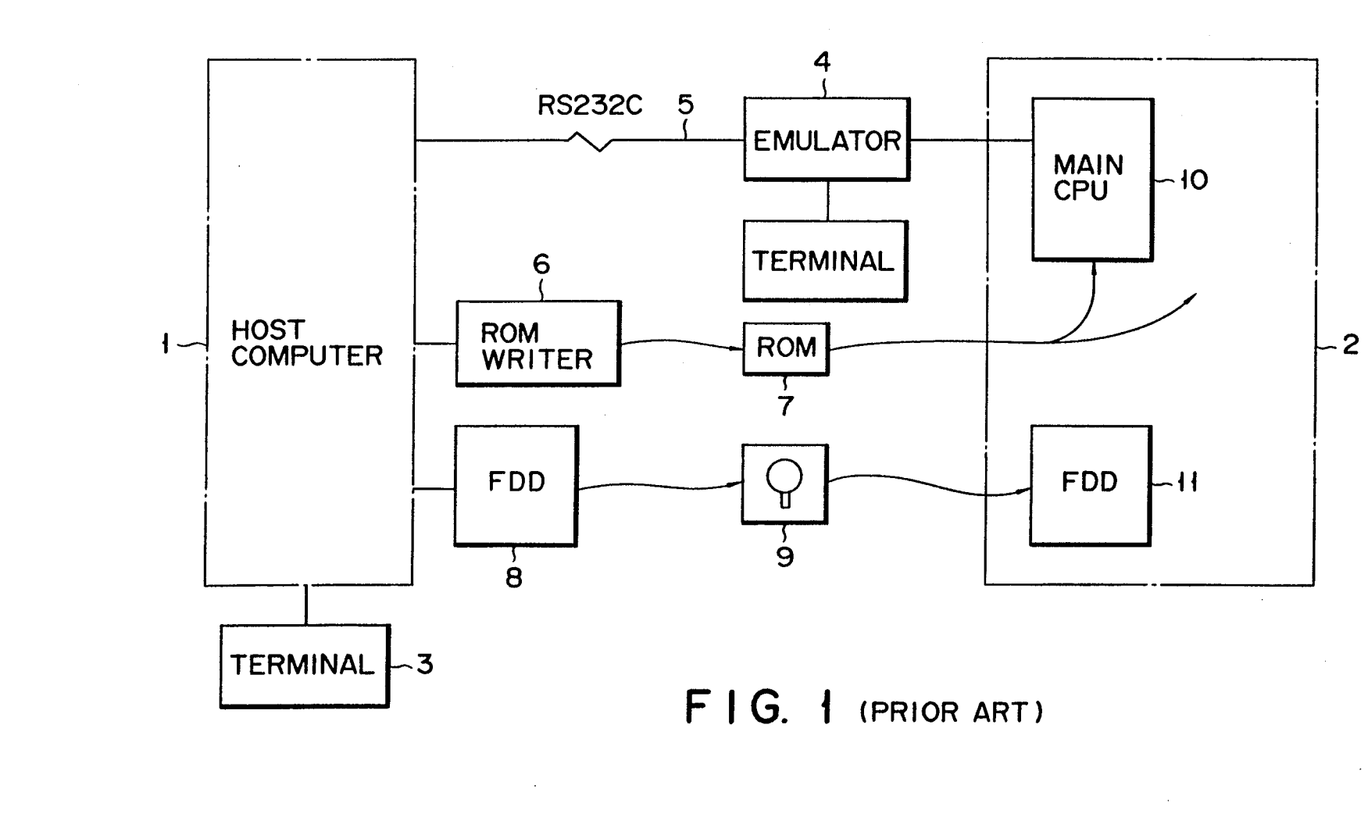
FIG. 1 is a block diagram showing a conventional cross-software development/maintenance system.

Conventionally, software file transfer between a host computer system and a target computer system will now be described, with reference to FIG. 1. In FIG. 1, in response to an instruction of a terminal 3, a host computer system 1 develops a software program to be executed by a target computer system 2 in the form of an execution load module.

The software program (execution load module) developed by the host computer system 1 is transferred to the target computer system 2 through a communication line 5 connected to an in circuit emulator (ICE) 4. The ICE 4 is normally used for debugging of the target computer system 2. The target computer system 2 stores the received execution load module in a secondary storage device, e.g., a floppy disk device 11 under the control of a main CPU 10.

According to another method of transferring an execution load module to a target computer system, a ROM writer 6 is connected to the host computer system 1, the execution load module is written in a ROM (Read Only Memory) chip 7 by the ROM writer 6, and the ROM chip 7 is mounted in the target computer system 2.

According to still another method, a floppy disk device (FDD) 8 is connected to the host computer system 1, and the execution load module from the host computer system 1 is converted to a recording format of the FDD 8 and is written in a floppy disk (FD) 9. The floppy disk 9 written with the execution load module is set in an FDD of the target computer system 2, thus transferring a cross-software file.

However, when an execution load module is transferred through a commercially available ICE 4, its information transfer speed is limited. Moreover, the greater the volume of a file to be transferred, the greater the amount of time required to transfer an execution load module. Therefore, when frequent changes must be made to a software program as a result of debugging, use of the above method is not practical.

When the target computer system 2 comprises a multi-CPU configuration, ICEs 4 are connected in units of CPUs. Since an execution load module must be transferred through these ICEs 4, communication procedures become complicated. Because of this, the target computer system 2 cannot be operated until the execution load modules have first been transferred to the plurality of CPUs.

On the other hand, when an execution load module is supplied to the target computer system 2 through the FD 9, and the software volume is large, a large number of FDs 9 are required, resulting in long read/write time. Furthermore, software change procedures become complicated.

Supply of an execution load module using the ROM chip 7 is effective when a software volume is small. However, it takes much time to mount the ROM chip 7 on the target computer system 2, and a large number of chips are required to transfer a program of a large volume (e.g., transfer of a program requiring a storage capacity of 1 Mbyte). This method cannot be applied to a practical application.

In order to solve these problems, after an execution load module is supplied to the target computer system 2, debugging may be performed on the target computer system 2. However, since the target computer system 2 has poor software development environment, it must debug the execution software module using object codes, i.e., must perform so-called patch-work. For this reason, debugging efficiency is very poor. When a source program is written in a high-level language, it is difficult to correct it on the target computer system 2 using the assembler or machine language. Thus, this disturbs software development in a high-level software language.

The above-mentioned problems are posed not only in a software development process but in a test process after hardware is completed or in a software change process after a product is delivered

SUMMARY OF THE INVENTION

It is an object of the present invention to provide a cross-software development/maintenance system which allows software development in a high-level language in a host computer system, facilitates transfer of a load module developed on the host computer system to a target computer system, and facilitates correction of a load module supplied to the target computer system.

In order to achieve the above object, a cross-software development/maintenance system of the present invention comprises: a target computer system having a multiprocessor in which a plurality of central processing units (CPUs) including local CPUs have a hierarchical structure, and a secondary storage device, the target computer system having poor software development environment; a host computer system for developing a software file executed by the target computer system and maintaining the target computer system; exclusive file transfer communication line means, connected between the host computer system and the secondary storage device controller or CPU of the target computer system, for transferring the software file created by the host computer system and transferring the software file stored in the secondary storage device to the host computer system; and file transfer control means for storing the software file transferred through the exclusive file transfer communication line means in the secondary storage device independently of an operation of the multiprocessor of the target computer system, and transferring the software file stored in the secondary storage device to the host computer system when correction is necessary.

According to the present invention, the host computer system and the secondary storage device controller of the target computer system are directly coupled through a communication line exclusively used for file transfer. Independently of operations of a main CPU and a local CPU in the target computer system, a software file (execution load module) is directly stored from the host computer system into the secondary storage device (e.g., a hard disk) of the target computer system. Installation of initial software upon product delivery of a target computer system, change of software after delivery, and troubleshooting of software can be efficiently performed. A time in which the operation of the target computer system must be stopped to supply a new program from the host computer system to the target computer system is only a time required for loading an initial program from, e.g., a hard disk, and a loss time can be greatly shortened. Upon debugging, an emulator needs to be connected to only a CPU which requires debugging. Even when a bug is found, a source program is corrected in the high-level language on the host computer system, and the corrected execution load module can be supplied to the target computer system, thus greatly improving software development efficiency. Since correction of bugs and file transfer of the corrected execution-load module can be parallelly performed, the operation of the target computer system need not be stopped. For this reason, a software program can be efficiently changed/corrected within a short period of time.

Since information of a trouble occurring on the target computer system can be quickly transferred to the host computer system through the exclusive communication line, detailed troubleshooting can be efficiently performed.

If a program is developed using a high-level language in the host computer system and is supplied to the target computer system, the program can be easily corrected by the host computer system and can be easily supplied to the target computer system again, thus efficiently performing replacement/correction of an execution load module. Furthermore, since transfer capacity is remarkably improved, file transfer from a remote location can be performed using a digital network such as an ISDN (Integrated Service Digital Network).

BRIEF DESCRIPTION OF THE DRAWINGS

Other objects and features of the present invention will be apparent from the description taken in conjunction with the following drawings in which.

DETAILED DESCRIPTION OF THE PREFERRED EMBODIMENT

An embodiment of the present invention will now be described with reference to the accompanying drawings.

Figure 2:
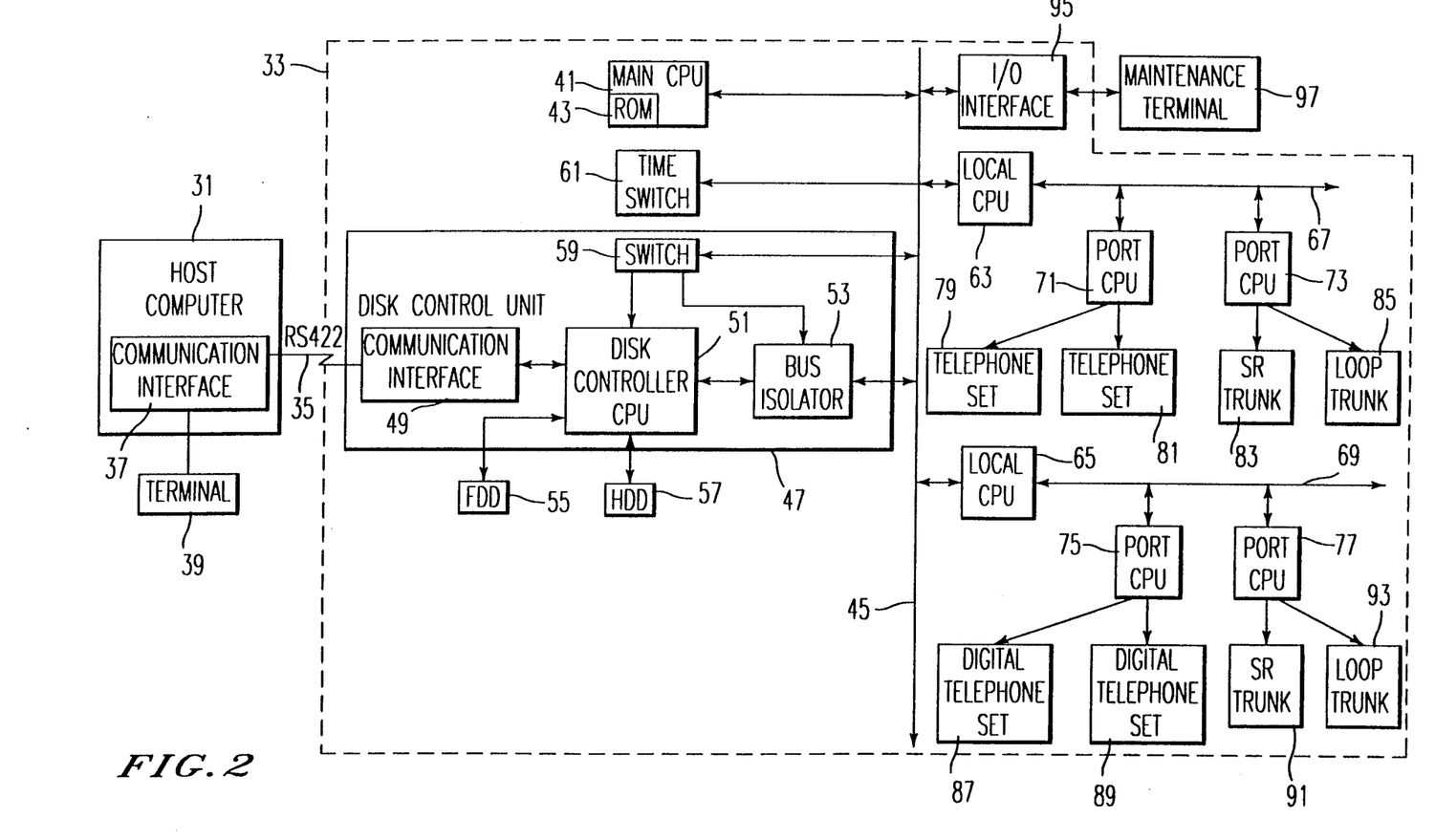
FIG. 2 is a block diagram showing a cross-software development/maintenance system according to the present invention.

FIG. 2 is a block diagram showing an embodiment of the present invention.

As shown in FIG. 2, a host computer system 31 and a target computer system 33 are connected through an exclusive communication line 35 for transferring a software file such as an execution load module.

The host computer system 31 belongs to a so-called supermini computer class, and may comprise VAX series computers available from Digital Equipment Corp., U.S.A. The host computer system 31 has a high-speed communication interface 37 for communicating with the target computer system 33 (to be described later) through the exclusive communication line 35, and a terminal 39 for inputting data, commands, and the like. The host computer system 31 creates an execution load module to be executed in the target computer system 33, and transfers it to the target computer system 3 through the exclusive communication line 35. More specifically, the host computer system 31 creates a source program using a high-level language, e.g., "C". The source program is compiled to create object modules for the host computer system, e.g., "VAX" using a "C" native compiler. The object modules are linked using a symbolic linker to create an execution load module. The host computer system 31 executes the execution load module to simulate functions in the target computer system 33. In this process, the system 31 removes bugs (syntax errors, logic errors, and the like). Upon completion of simulation, the host computer system 31 compiles the source program using a PBX cross compiler to obtain object modules. The object modules are linked using the symbolic linker to create a PBX execution load module. The PBX execution load module developed in this manner is sent to the target computer system 33 through the communication line 35.

The exclusive communication line 35 can employ, e.g., a 250-bps RS-422 interface. In this case, as a practical file transfer speed, 1 Mbyte/min can be realized. Although this embodiment employs an RS-422 type interface, the present invention is not limited to this. For example, an RS-232C interface may be used, or an "Ethernet" communication line developed by Xerox Corp., U.S.A. may be used. As a communication protocol, a file transfer program "kermit" developed by Columbia University, U.S.A. can be applied. The host computer system 31 and the target computer system 33 can communicate with each other.

The target computer system 33 is a computer system for executing a software program created by the host system as a control program. In this embodiment, the target computer system 33 comprises, e.g., a middle-capacity electronic exchanger (PBX) which has a line connection capacity of about 1,500 lines. The target computer system 33 comprises a main CPU (Central Processing Unit) 41. The main CPU 41 comprises, e.g., a 16/32-bit microprocessor M68000 available from Motorola Inc., U.S.A. and controls respective units, such as a local CPU, a port CPU, a disk control unit, and the like of the target computer system 33. The main CPU 41 has a ROM (Read Only Memory) 43 for storing an initial program loader (IPL) for loading an execution load module to CPUs (to be described later). The main CPU 41 is connected to a system bus 45.

The system bus 45 is connected to a disk control unit 47. The disk control unit 47 comprises a communication interface 49 for performing communication with the host computer system 31 through the communication line 35 of the RS 422 interface, a disk controller CPU 51, and a bus isolator 53. The disk controller CPU 51 comprises, e.g., an 8-bit microprocessor Z80 available from Zilog Inc., U.S.A. and is connected to a floppy disk drive (FDD) 55 and a hard disk driver (HDD) 57. An execution load module transferred from the host computer system 31 is received at the communication interface 49, and is stored in the HDD 57 through the disk controller CPU 51. Although the transferred execution load module is stored in the HDD 57 in this embodiment, it may be stored in the FDD 55. When a trouble occurs during an operation of the target computer system, the trouble data is stored in the HDD 57, is transferred from the target computer system 33 to the host computer system 31 later, and is analyzed by the host computer system 31.

The bus isolator 53 is a device for isolating the disk control unit 47 from the system bus 45. Isolation is performed when a new execution load module from the host computer system 31 is stored in the HDD 57 while the target computer system 33 executes debugging, maintenance, and the like. More specifically, in the cross-software development/maintenance system of the present invention, debugging in the target computer system 33 and file transfer of an execution load module can be parallelly performed. The bus isolation is performed by a switch 59. More specifically, the main CPU 41 supplies a command for isolation to the switch 59 through the system bus 45. In response to the command, the switch 59 supplies switch data to the bus isolator 53 and the disk controller CPU 51. As a result, the bus isolator 53 isolates a control line connected to the main CPU 41 from the disk controller CPU 51 in a hardware manner. Alternatively, a panel switch may be provided to the disk control unit 47 and be operated to control the bus isolator 53, so that a control line connected to the main CPU 41 is isolated from the disk controller CPU 51 in a hardware manner.

A time switch 61 is an indispensable component for constituting a speech path of a digital exchanger, and comprises an SPM (Speech Path Memory) for storing digital-encoded speech data corresponding to a multiplex degree of a highway, an SCM (Speech Path Control Memory) for designating a read address of the SPM, a counter circuit for sequentially writing digital-encoded speech data in the SPM, and the like.

The system bus 45 is connected to local CPUs 63 and 65. Each of the local CPUs 63 and 65 comprises, e.g., a 16/32-bit microprocessor available from Motorola Inc., U.S.A. The local CPUs 63 and 65 localize processing while the main CPU 41 controls the entire system. For example, as described above, the system of this embodiment has a line connection function of about 1,500 Lines. Each of the line CPUs 63 and 65 executes a line connection function of about 750 lines. The local CPUs 63 and 65 are connected to port CPU (peripheral CPUs) 71, 73, 75, and 77 through local buses 67 and 69, respectively. Each of the port CPUs 71, 73, 75, and 77 comprises an 8-bit microprocessor Z80 available from Zilog Inc., U.S.A. and controls a line/trunk circuit. More specifically, the port CPUs 71, 73, 75, and 77 include an SRTI (SR Trunk Interface), an LPTI (Loop Trunk Interface), a COTI (Central Office Trunk Interface), a BSTI (Basic Station Telephone Interface), and the like. The port CPU 71 is connected to a plurality of telephone sets 79, 81, and the like. The port CPU 73 is connected to an SR trunk 83, an SR trunk 85, and the like. The DSTI port CPU 75 is connected to a plurality of digital telephone sets 87, 89, and the like. The DSTI port CPU 77 is connected to a loop trunk 91, a loop trunk 93, and the like. In this manner, in the electronic exchanger of this embodiment, a plurality of CPUs constitute a hierarchical structure.

The system bus 45 is connected to an I/0 interface 95. The I/O interface 95 comprises, e.g., an 8-bit microprocessor Z80 available from Zilog Inc., U.S.A. and interfaces between an external maintenance terminal 97 (or an emulator (not shown)) and the devices 41, 61, 59, 47, 63, and 65 connected to the system bus 45.

The operation of the embodiment of the present invention with the above arrangement will now be described. The host computer system 31 creates a software program (source program) necessary for operating the target computer system 33 in a high-level language in response to a command input from the terminal 39. The system 31 then compiles the source program using a native compiler to create object programs (modules), and links the object modules using a link editor to create an execution load module.

The host computer system 31 executes simulation of the created execution load module to remove bugs. The system 31 then compiles the source program from which the bugs are removed using a PBX cross compiler to create PBX object modules and links the object modules using a symbolic linker to create an execution load module. The host computer system 31 receives a file of program trouble data, or the like generated in the target computer system 33, and then executes maintenance processing such as analysis of its content, program correction, or the like.

The host computer system 31 supplies a load module executed by the plurality of CPUs 41, 63, 65, and 51 to the disk controller CPU 51 through the exclusive communication line 35 and the high-speed communication interface 49. The disk controller CPU 51 stores the supplied execution load module in the HDD 57. When the target computer system 33 is started, the stored module is supplied to the CPUs 51, 63, 65, 71, 73, 75, and 77 by the IPL stored in the ROM 43 of the main CPU 41.

Figure 3:
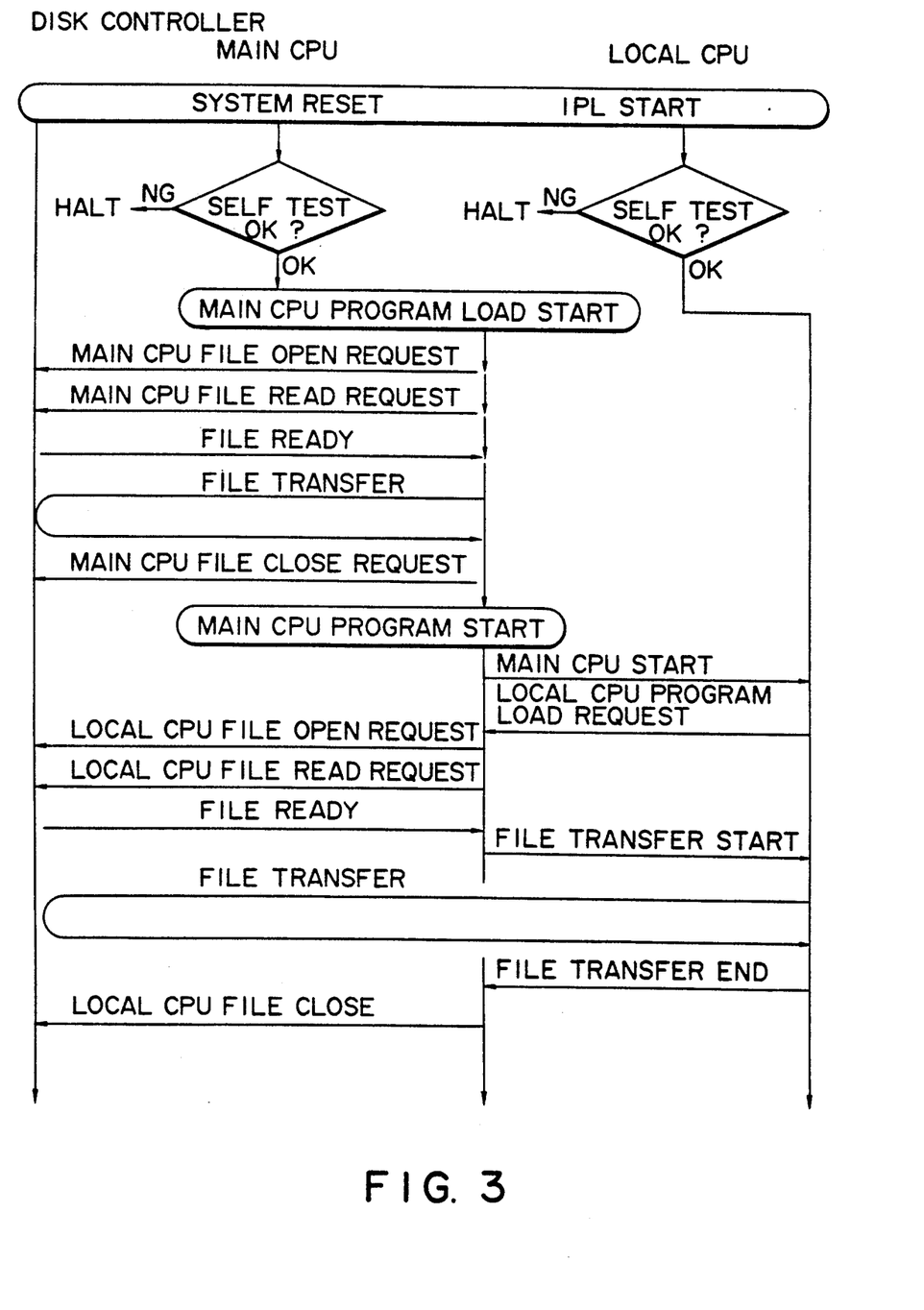
FIG. 3 is a flow chart showing initial program loading in a target- computer system.

Initial program loading is executed as shown in, e.g., FIG. 3. More specifically, the main CPU 41 and the local CPUs 63 and 65 execute self tests. If the self test results are affirmative, program loading to the main CPU is started. More specifically, the main CPU 41 issues a request to open a file for the main CPU 41 to the disk controller CPU 51. In response to this request, the disk controller CPU 51 opens the designated file. The main CPU 41 issues a read request of the main CPU file to the disk controller CPU 51. In response to this request signal, the disk controller CPU 51 sends a file ready signal to the main CPU 41. At the same time, the CPU 51 reads the main CPU file, and transfers the read-out file to the main CPU 41 Upon completion of the file transfer, the main CPU 41 outputs a request to close the file to the disk controller CPU 51.

The main CPU 41 executes the main CPU program based on the transferred main CPU file. More specifically, the main CPU 41 sends a main CPU start signal to the local CPUs 63 and 65. In response to this signal, the local CPUs 63 and 65 issue load requests of local CPU programs to the main CPU 41. In response to the program load requests, the main CPU 41 sends a transfer start signal for the local CPU to the local CPUs 63 and 65, and transfers files for the local CPUs 63 and 65. Upon completion of the file transfer, the local CPUs send file transfer completion signals to the main CPU. In response to the file transfer completion signals, the main CPU 41 issues a request to close the file to the disk controller CPU 51.

The disk controller CPU 51 always performs read-/write access of a file to the HDD 57 under the control of the main CPU 41. When a file content stored in the FDD 55 or the HDD 57 must be rewritten due to a program bug or the like, or when the target computer system 33 causes a trouble and trouble data is stored, a command is input from a keyboard (not shown) or a switch on a front panel (not shown) provided to the disk control unit 47 is operated to control the bus isolator 53, thus establishing the file communication line 35 with the host computer system 31.

In response to the establishment command of the exclusive communication line 35, the target computer system 33 isolates the disk controller CPU 51 from the control of the main CPU 41 or limits read/write access of files. The system 33 then starts file transfer between the host and target computer systems 31 and 33 through the high-speed communication interfaces 37 and 49 and the communication line 35 independently of the operation of the main CPU 41. For this reason, a time required for stopping the operation of the target computer system 33 in order to supply a new program from the host computer system 31 to the target computer system 33 is only a time required for loading an initial program from, e.g., the HDD 57, resulting in a very small time loss. In a software debugging mode, an emulator (not shown) is connected to only a CPU which requires debugging. As the emulator, the Model 8540 available from Tektronix Corp., U.S.A. can be employed. As a result of debugging, when bugs are found, the host computer system corrects the source program in the highlevel language, and sends the corrected execution load module to the target computer system 33. In this case, the main CPU 41 of the target computer system 33 can supply a command for isolating the disk control unit 47 from the system bus 45 to the switch 59. As a result, since the switch 59 supplies a switching signal to the bus isolator 53 and the disk controller CPU 51, the bus isolator 53 isolates the control line to the main CPU 41 from the disk controller CPU 51 in a hardware manner. As a result, the corrected execution load module can be stored in the HDD 57 while executing debugging described above. In this embodiment, a PBX has been exemplified as the target computer system. However, the present invention can be applied to other systems, e.g., a system in which a plurality of CPUs have a hierarchical structure.

Figure 4:
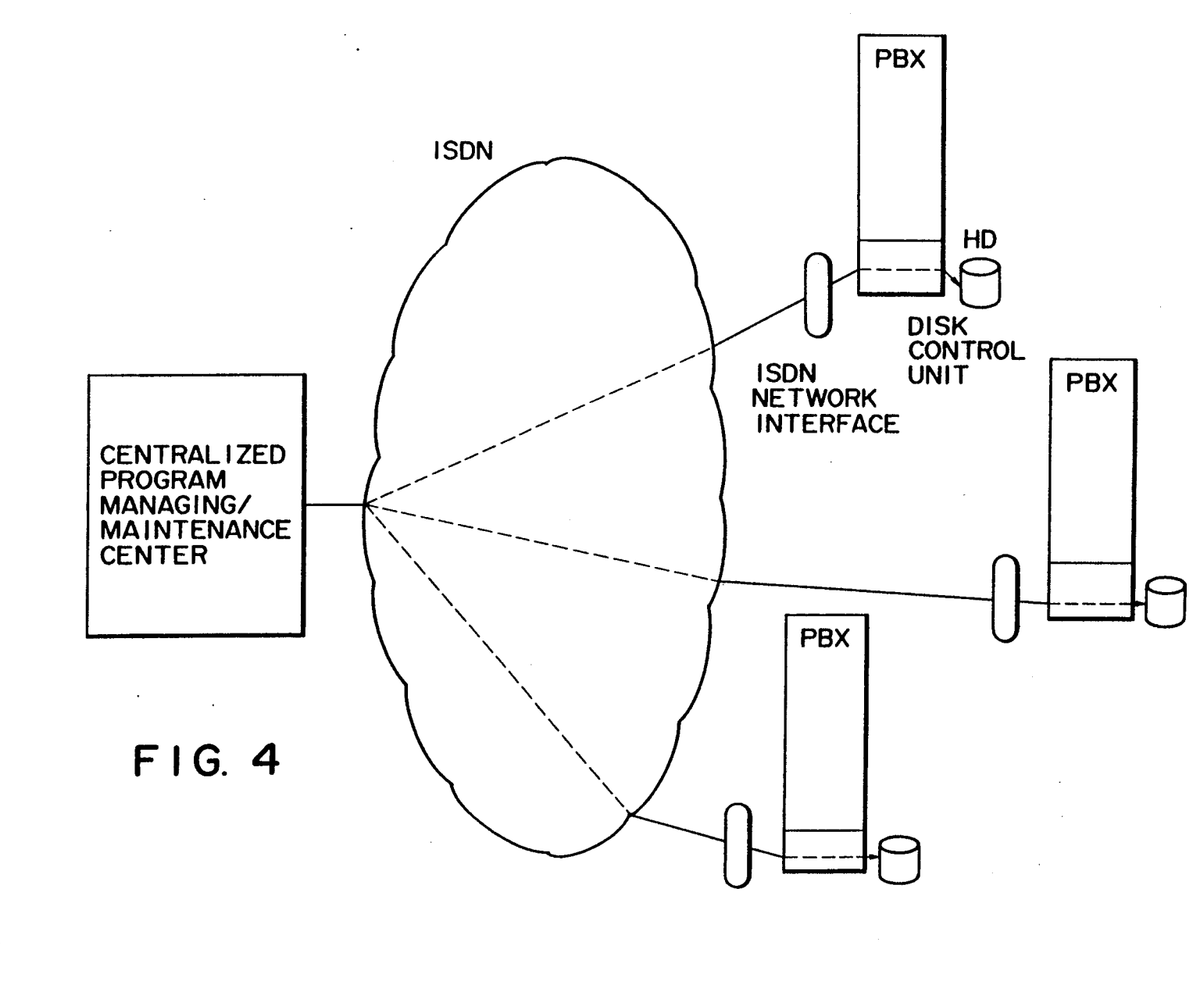
FIG. 4 is a schematic view showing a case wherein a plurality of exchangers are connected to a centralized program managing/maintenance center through an ISDN.

As shown in FIG. 4, if a plurality of target computer systems (PBXs) shown in FIG. 2 are connected to a centralized program managing/maintenance center through an ISDN, development and maintenance of programs of PBXs at remote locations including foreign countries can be performed.

What is claimed is:

1. A cross-software development/maintenance system having a host computer system having a software development environment, said cross-software development/maintenance system comprising:

a target computer comprising a system bus, a main central processing unit coupled to the system bus and including an initial program loader, a secondary storage device for said main central processing unit and for storing a software file which is developed i said host computer system and is to be executed by said main central processing unit of said target computer system, and a secondary storage device control means, connected to said secondary storage means and said host computer system, for controlling the transfer of said software file between said host computer system and said secondary storage device while the secondary storage device is disconnected from the main central processing unit;

means, coupled to said secondary storage device control means and to the system bus, for disconnecting the secondary storage device from the system bus; and means for transferring the software file from said secondary storage device to said main central processing unit when said initial program loader is started.

2. A system according to claim 1, further comprising:

a plurality of local central processing units which are connected to said main central processing unit in a hierarchical manner and share said secondary storage device with said main central processing unit; and means for transferring the software file from said main central processing unit to said local central processing units after the software file has been transferred from said host system to said secondary storage device.

3. A cross-software development/maintenance system having a host computer system having a software development environment, said cross-software development/maintenance system comprising:

a target computer comprising a system bus, a main central processing unit coupled to the system bus, a secondary storage device for storing a software file developed in said host computer system which is for execution by said main central processing unit, and a secondary storage device control unit, connected to the secondary storage means and said host computer system, for controlling the transfer of the software file between said host computer system and said secondary storage device; and isolator means, coupled to said secondary storage device control means and to the system bus, for isolating said secondarystoratge device control unit and secondary storage device from said main central processing unit, thereby allowing said secondary storage device control unit to execute the software file transfer operation independent of an operation of said main central processing unit.

4. A computer system, controlled by software files transferred from an external host computer system having a software development environment via a communication line, comprising:

a system bus;

a main central processing unit connected to said system bus;

secondary storage means for storing software files transferred from said external host computer system;

secondary storage control means, coupled to said secondary storage means and to the host computer system, for controlling the transfer of said software files between said external host computer system and said secondary storage means; and bus isolator means, connected to said secondary storage control means and to said system bus, for isolating said secondary storage control means from said system bus, thereby allowing said secondary storage control means to execute the file transfer operation independent of an operation of said main central processing unit.

5. A computer system of claim 4, further comprising:

switch means for producing data to control said bus isolator means during said transfer of said software files.

6. A computer system, controlled by software files transferred from an external host computer system having a software development environment via a communication line, comprising:

a system bus;

a main central processing unit including read only memory means for storing an initial program loader, said main central processing unit coupled to said system bus;

secondary storage means for storing software files transferred from said external host computer system;

secondary storage control means, connected to said secondary storage means and said external host computer, for controlling the transfer of said software files between said external host computer system and said secondary storage means;

bus isolator means, connected to said secondary storage control means and said system bus, for isolating said secondary storage control means from said system bus to permit said secondary storage control means to execute the file transfer operation independent of an operation of said main central processing unit, wherein said main central processing unit executes the loading operation of the software files from said secondary storage means when the initial program loader is started.

7. A system according to claim 1, wherein said target computer is an electronic exchange device comprising telephone terminals connected to the main central processing unit.

8. A system according to claim 1, wherein said host computer comprises means for developing a source program and an object program, means for debugging the source and object programs, means for developing an execution load module, and means for transferring the execution load module to the target computer.

9. A system according to claim 1, wherein said secondary storage device comprises a hard-disk drive device connected to the main central processing unit and the file transfer line.

10. A system according to claim 1, further comprising second target computers which are connected to said host computer through an ISDN.

11. A system according to claim 1, wherein said file transfer line is an RS-422 communication line.

12. A system according to claim 1, wherein said file transfer line further transfers the software files stored in said secondary storage device to said host computer system.

13. A system according to claim 3, wherein said target computer comprises an electronic exchange device comprising telephone terminals connected to the main central processing unit.

14. A system according to claim 3, wherein said host computer comprises means for developing a source program and an object program, means for debugging the source and object programs, means for developing an execution load module, and means for transferring the execution load module to the target computer.

15. A system according to claim 3, wherein said secondary storage device comprises a hard-disk drive device connected to the main central processing unit and to the file transfer line.

16. A system according to claim 3, further comprising second target computers which are connected to said host computer through an ISDN.

17. A system according to claim 3, wherein said file transfer line is an RS-422 communication line.

18. A system according to claim 3, wherein said file transfer line further transfers the software files stored in said secondary storage device to said host computer system.

19. A system according to claim 4, wherein said main CPU is part of a target computer and said target computer comprises an electronic exchange device comprising telephone terminals connected to the main central processing unit.

20. A system according to claim 4, wherein said host computer comprises means for developing a source program and an object program, means for debuffing the source an object programs, and means for developing an execution load module, and means for transferring an execution load module to the target computer.

21. A system according to claim 4, wherein said secondary storage device comprises a hard-disk drive device connected to the main central processing unit and to the file transfer line.

22. A system according to claim 4, further comprising second target computers which are connected to a single host computer through an ISDN.

23. A system according to claim 4, further comprising a dedicated file transfer communication line connecting the host computer to said secondary storage means, said file transfer line comprising an RS-422 communication line.

24. A system according to claim 4, further comprising a file transfer line connecting the host computer to said secondary storage means, wherein said file transfer line further transfers software files stored in said secondary storage device to said host computer system.

25. A system according to claim 6, wherein said main CPU is part of a target computer and said target computer comprises an electronic exchange device comprising telephone terminals connected to the main central processing unit.

26. A system according to claim 6, wherein said host computer comprises means for developing a source program and an object program, means for debugging the source and object programs, means for developing an execution load module, wherein the main CPU is part of a target computer, and means for transferring the execution load module to the target computer.

27. A system according to claim 6, wherein said secondary storage device comprises a hard-disk drive device connected to the main central processing unit and to the file transfer line.

28. A system according to claim 6, further comprising second target computers which are connected to said host computer through an ISDN.

29. A system according to claim 6, further comprising a file transfer line connected between the host computer and the secondary storage means, wherein the file transfer line comprises an RS-422 line.

30. A system according to claim 6, further comprising a file transfer line connected between the host computer and the secondary storage means, wherein said file transfer line further transfers the software files stored in said secondary storage device to said host computer system.

31. A system according to claim 1, further comprising a plurality of local central processing units which are connected to said main central processing unit in a hierarchical manner and share the secondary storage device with said main central processing unit.

32. A system according to claim 3, further comprising a plurality of local central processing units which are connected to said main central processing unit in a hierarchical manner and share the secondary storage device with said main central processing unit.

33. A system according to claim 4, further comprising a plurality of local central processing units which are connected to said main central processing unit in a hierarchical manner and share the secondary storage device with said main central processing unit.

34. A system according to claim 6, further comprising a plurality of local central processing units which are connected to said main central processing unit in a hierarchical manner and share the secondary storage device with said main central processing unit.

35. An electronic exchange apparatus, comprising:
a central processing unit coupled to a system bus an for exchanging telephone terminals in accordance with a given program which is developed and downloaded by a host computer system via a program transfer line, the apparatus comprising:
a secondary storage means for storing data for said central processing unit and for storing a program transmitted from said host computer system via the program transfer line;
means, coupled to said system bus and to a secondary storage control means, for inhibiting access of the secondary storage control means by said central processing unit during transfer of the program from said host computer system to said secondary storage means, wherein said secondary storage control means is connected to said program transfer line and to said secondary storage means for controlling said secondary storage means; and
means for loading the program in the secondary storage device into said central processing unit while stopping operation of the central processing unit when an initial program loading instruction is issued.

36. An apparatus according to claim 35, wherein said inhibiting means comprises means for disconnecting said secondary storage means from said central processing unit and instead connecting said secondary storage means to the program transfer line during transfer of the program from said host computer system to said secondary storage means.

37. An apparatus according to claim 35, wherein said central processing unit comprises a main central processing unit connected to said secondary storage means through a system bus, local central processing units connected to said main central processing unit through the system bus, port central processing units for exchanging telephone terminals, at least some of the port central processing units being connected to a local central processing unit.

38. An apparatus according to claim 35, wherein said secondary storage means comprises a hard-disk drive device connected to the program transfer line and said central processing unit.

* * * * *